US012773668B2

(12) United States Patent
Noda et al.

(10) Patent No.: US 12,773,668 B2
(45) Date of Patent: Oct. 27, 2026

(54) SEPARATION MEMBRANE COMPLEX, SEPARATION APPARATUS, SEPARATION METHOD, AND METHOD OF PRODUCING SEPARATION MEMBRANE COMPLEX

(71) Applicant: NGK INSULATORS, LTD., Nagoya-City (JP)

(72) Inventors: Kenichi Noda, Nagoya-City (JP); Ko Kobayashi, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 645 days.

(21) Appl. No.: 18/317,193

(22) Filed: May 15, 2023

(65) Prior Publication Data

US 2023/0277989 A1 Sep. 7, 2023

Related U.S. Application Data

(63) Continuation of application No. PCT/JP2021/036740, filed on Oct. 5, 2021.

(30) Foreign Application Priority Data

Dec. 17, 2020 (JP) ................................ 2020-209108

(51) Int. Cl.
*B01D 71/02* (2006.01)
*B01D 53/22* (2006.01)
(Continued)

(52) U.S. Cl.
CPC ....... *B01D 71/0281* (2022.08); *B01D 53/228* (2013.01); *B01D 67/0051* (2013.01);
(Continued)

(58) Field of Classification Search
CPC ........ B01D 39/00; B01D 39/14; B01D 39/20; B01D 39/2003; B01D 39/2068;
(Continued)

(56) References Cited

U.S. PATENT DOCUMENTS 4,581,211 A 4/1986 Araya et al.
2008/0156721 A1 7/2008 Noda et al.
(Continued)

FOREIGN PATENT DOCUMENTS

DE 11 2016 005 301 T5 8/2018
JP 2009214075 A * 9/2009
(Continued)

OTHER PUBLICATIONS

English translation of the International Preliminary Report on Patentability (Chapter I) dated Jun. 29, 2023 (Application No. PCT/JP2021/036740).
(Continued)

*Primary Examiner* — Allison G Fitzsimmons
(74) *Attorney, Agent, or Firm* — Muncy, Geissler, Olds & Lowe, P.C.

(57) ABSTRACT

A separation membrane complex includes a support, a separation membrane, and a coating membrane. The support includes a porous portion and a dense portion that are arranged continuously. The separation membrane is provided on the porous portion of the support. The separation membrane has an end portion that is in contact with the dense portion. The coating membrane is composed by a layered inorganic compound. The coating membrane coats a boundary portion between the dense portion and the separation membrane.

12 Claims, 5 Drawing Sheets

(51) Int. Cl.

| | |
|---|---|
| ***B01D 67/00*** | (2006.01) |
| ***B01D 69/02*** | (2006.01) |
| ***B01D 69/10*** | (2006.01) |
| ***B01D 69/12*** | (2006.01) |

(52) U.S. Cl.

CPC ......... *B01D 67/0088* (2013.01); *B01D 69/02* (2013.01); *B01D 69/108* (2022.08); *B01D 69/12* (2013.01); *B01D 71/02* (2013.01); *B01D 67/0083* (2013.01); *B01D 2323/081* (2022.08); *B01D 2325/0233* (2022.08); *B01D 2325/04* (2013.01); *B01D 2325/20* (2013.01)

(58) Field of Classification Search

CPC ............ B01D 39/2075; B01D 39/2079; B01D 39/2093; B01D 63/08; B01D 63/081; B01D 63/082; B01D 63/087; B01D 67/00; B01D 67/0039; B01D 67/0044; B01D 67/0051; B01D 67/0067; B01D 67/0079; B01D 67/00791; B01D 67/00793; B01D 67/0081; B01D 67/0088; B01D 67/0095; B01D 69/06; B01D 69/10; B01D 69/105; B01D 69/106; B01D 69/108; B01D 69/1216; B01D 71/02; B01D 71/025; B01D 71/028; B01D 71/0281; B01D 71/04; B01D 2239/10; B01D 2275/00; B01D 2275/10; B01D 2275/205

See application file for complete search history.

(56) References Cited

U.S. PATENT DOCUMENTS

| | | | | |
|---|---|---|---|---|
| 2009/0206025 | A1* | 8/2009 | Ichikawa ............ | B01D 71/021 210/489 |
| 2015/0190755 | A1 | 7/2015 | Miyahara et al. | |
| 2017/0232401 | A1 | 8/2017 | Miyahara et al. | |
| 2017/0284245 | A1 | 10/2017 | Suzuki et al. | |
| 2018/0250639 | A1 | 9/2018 | Yamazaki et al. | |
| 2021/0197118 | A1 | 7/2021 | Noda et al. | |

FOREIGN PATENT DOCUMENTS

| | | | |
|---|---|---|---|
| JP | 2010-110704 | A | 5/2010 |
| JP | 2011-057540 | A | 3/2011 |
| JP | 2017-177688 | A | 10/2017 |
| WO | 2008/038524 | A1 | 4/2008 |
| WO | 2014/050702 | A1 | 4/2014 |
| WO | 2016/093192 | A1 | 6/2016 |
| WO | 2020/071107 | A1 | 4/2020 |

OTHER PUBLICATIONS

German Office Action (with English translation) dated Feb. 5, 2026 (Application No. 11 2021 005 859.2).

Juna Bae, et al., "EU-12: A Small-Pore, High-Silica Zeolite Containing Sinusoidal Eight-Ring Channels," *Angewandte Chemic, International Edition,* 2016, vol. 55, pp. 7369-7373 (5 pages).

Abraham Araya, et al., "Synthesis, Properties, and Catalytic Behavior of Zeolite EU-12," *Zeolites,* Jan. 1992, vol. 12, pp. 24-31 (8 pages).

International Search Report and Written Opinion (Application No. PCT/JP2021/036740) dated Nov. 22, 2021.

Japanese Office Action (with English translation) dated Jul. 25, 2024 (Application No. 2022-569726).

* cited by examiner

START

PREPARE SUPPORT — S21

PREPARE SEED CRYSTALS — S22

DEPOSIT SEED CRYSTALS ON SUPPORT — S23

FORM ZEOLITE MEMBRANE — S24

REMOVE SDA — S25

COAT BOUNDARY PORTION WITH COATING MEMBRANE — S26

HEAT-TREAT SEPARATION MEMBRANE COMPLEX — S27

END

SEPARATION MEMBRANE COMPLEX, SEPARATION APPARATUS, SEPARATION METHOD, AND METHOD OF PRODUCING SEPARATION MEMBRANE COMPLEX

CROSS-REFERENCE TO RELATED APPLICATIONS

The present application is a continuation application of International Application No. PCT/JP2021/036740 filed on Oct. 5, 2021, which claims the benefit of priority to Japanese Patent Application No. 2020-209108 filed on Dec. 17, 2020. The entire contents of these applications are incorporated herein by reference.

TECHNICAL FIELD

The present invention relates to a separation membrane complex and a technique for separating a mixture of substances, using the separation membrane complex.

BACKGROUND ART

Various studies and developments are currently underway on, for example, separation or adsorption of specific molecules using a separation membrane such as a zeolite membrane.

For example, International Publication No. 2016/093192 (Document 1) discloses a separation membrane structure that includes a porous support, a pair of dense glass seals that cover both end faces of the porous support, and a zeolite membrane formed on the porous support as a separation membrane complex suitable for separation of liquid and gas.

In such a separation membrane complex, the glass seals covering the end faces of the porous support cover the surfaces of the end portions of the porous support, and the zeolite membrane is formed in contact with the glass seals. In this way, in the case where dense portions such as the glass seals are in contact with the separation membrane such as a zeolite membrane, defects such as cracks may occur in the separation membrane in the vicinity of a boundary portion between the separation membrane and the dense portions during the process of, for example, producing the separation membrane complex.

International Publication No. 2014/050702 (Document 2) proposes a method of closing both end portions of each defective cell with a polymer compound such as a synthetic resin and a method of pouring a polymer compound into each defective cell and curing the polymer as the methods of repairing defective cells in a monolithic separation membrane complex in which a zeolite membrane is formed on the inner surfaces of through holes (i.e., cells) of a column-like porous support (i.e., a monolithic porous support) that has a plurality of through holes extending in the longitudinal direction. By filling in defective cells themselves without directly repairing the cells in this way, it is possible to shorten the time required to repair defects in the separation membrane complex.

Japanese Patent Application Laid-Open No. 2009-214075 (Document 3) discloses a technique for reducing the defects in a boundary portion between a dense portion and a separation membrane formed on a porous support in a separation membrane complex by providing a coating zeolite in membranous form on the boundary portion, the coating zeolite covering both the separation membrane and the dense portion.

In the case where defective cells themselves are filled in as in Document 2, the number of cells that can be used for separation decreases. Thus, the separation membrane complex may have a lower flux. Even if a polymer compound in membranous form is provided on the boundary portion between the dense portion and the separation membrane in order to reduce the defects without filling in defective cells themselves, since the resistance of the polymer compound to heat and organic solvent is not so high, the polymer compound may deteriorate in early stages with the use of the separation membrane complex and accordingly separation performance may decrease.

In the case where the covering zeolite in membranous form is formed on the boundary portion between the dense portion and the separation membrane as in Document 3, it becomes necessary to form the covering zeolite by hydrothermal synthesis or any other method after formation of the dense portion and the separation membrane. This may complicate the process of producing the separation membrane complex and may increase the production cost of the separation membrane complex.

SUMMARY OF THE INVENTION

The present invention is intended for a separation membrane complex, and it is an object of the present invention to improve separation performance of the separation membrane complex and to easily produce the separation membrane complex.

A separation membrane complex according to one preferable embodiment of the present invention includes a support including a porous portion and a dense portion that are arranged continuously, a separation membrane provided on the porous portion of the support and having an end portion that is in contact with the dense portion, and a coating membrane composed by a layered inorganic compound and coating a boundary portion between the dense portion and the separation membrane.

According to the present invention, it is possible to improve the separation performance of the separation membrane complex and to easily produce the separation membrane complex.

Preferably, the layered inorganic compound may be either a clay mineral or a layered metal oxide.

Preferably, the layered inorganic compound may be a clay mineral.

Preferably, the layered inorganic compound may be smectite.

Preferably, the coating membrane may have an average thickness of greater than or equal to 0.002 μm.

Preferably, the separation membrane may be a zeolite membrane.

The present invention is also intended for a separation apparatus. A separation apparatus according to one preferable embodiment of the present invention includes the separation membrane complex described above, and a supplier that supplies a mixture of substances that includes a plurality of types of gas or liquid to the separation membrane complex. The separation membrane complex separates a substance with high permeability in the mixture of substances from the mixture of substances by allowing the substance to permeate through the separation membrane complex.

The present invention is also intended for a separation method. A separation method according to one preferable embodiment of the present invention includes a) preparing the separation membrane complex described above, and b)

supplying a mixture of substances that includes a plurality of types of gas or liquid to the separation membrane complex and separating a substance with high permeability in the mixture of substances from the mixture of substances by allowing the substance to permeate through the separation membrane complex.

Preferably, the mixture of substances may include one or more types of substances selected from among hydrogen, helium, nitrogen, oxygen, water, water vapor, carbon monoxide, carbon dioxide, nitrogen oxides, ammonia, sulfur oxides, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

The present invention is also intended for a method of producing a separation membrane complex. A method of producing a separation membrane complex according to one preferable embodiment of the present invention includes a) continuously arranging a dense portion and a porous portion of a support, b) forming a separation membrane on the porous portion of the support, and c) forming a coating membrane composed by a layered inorganic compound on a boundary portion between the separation membrane and the dense portion to coat the boundary portion, the separation membrane having an end portion that is in contact with the dense portion.

Preferably, the layered inorganic compound may be either a clay mineral or a layered metal oxide.

Preferably, the layered inorganic compound may be a clay mineral.

Preferably, the layered inorganic compound may be smectite.

Preferably, the coating membrane may have an average thickness of greater than or equal to 0.002 μm.

Preferably, the separation membrane may be a zeolite membrane.

Preferably, the method of producing a separation membrane complex described above may further include, after the operation c), heat-treating the support, the separation membrane, and the coating membrane at a temperature of higher than or equal to 200° C.

These and other objects, features, aspects and advantages of the present invention will become more apparent from the following detailed description of the present invention when taken in conjunction with the accompanying drawings.

DETAILED DESCRIPTION

Figure 1:
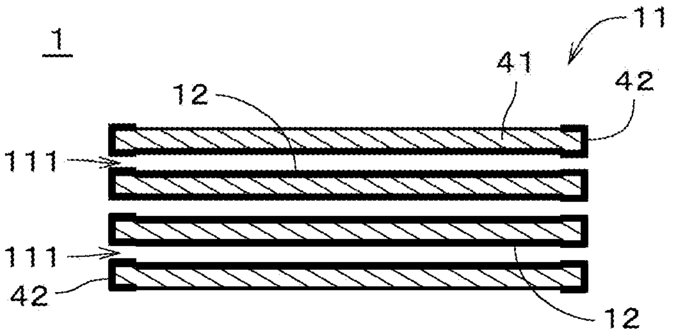
FIG. 1 is a sectional view of a separation membrane complex according to one embodiment.
Figure 2:
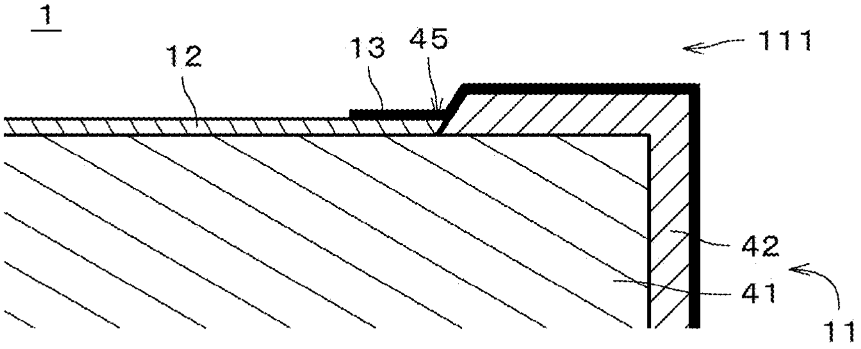
FIG. 2 is a sectional view illustrating an end portion of the separation membrane complex in enlarged dimensions.
Figure 3:
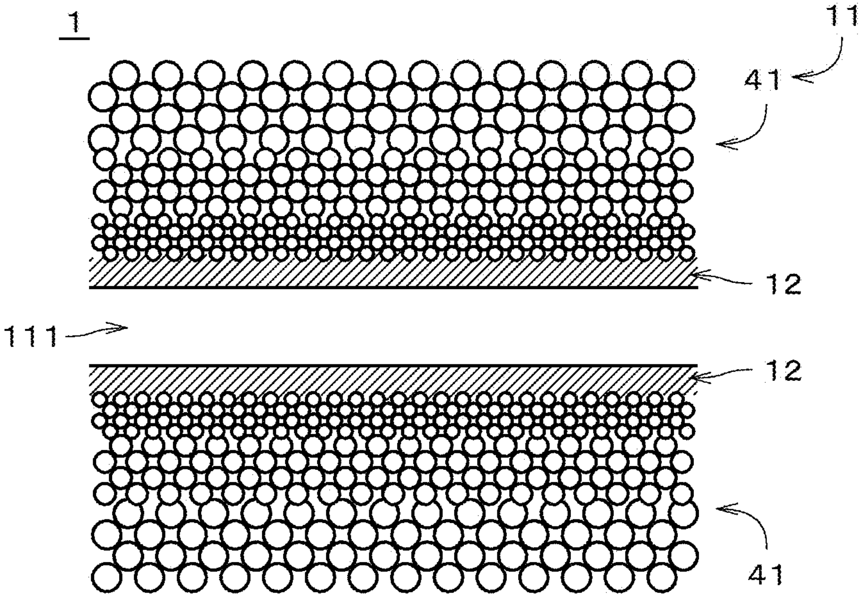
FIG. 3 is a sectional view illustrating a central portion of the separation membrane complex in enlarged dimensions.

FIG. 1 is a sectional view of a separation membrane complex 1 according to one embodiment of the present invention. FIG. 2 is a sectional view illustrating part of an end portion in the longitudinal direction (i.e., the right-left direction in FIG. 1) of the separation membrane complex 1 in enlarged dimensions. FIG. 3 is a sectional view illustrating part of a central portion in the longitudinal direction of the separation membrane complex 1 in enlarged dimensions.

The separation membrane complex 1 includes a support 11, a separation membrane 12, and a coating membrane 13. The support 11 includes a porous portion 41 that is a column-like main body, and dense portions 42 that cover the surfaces of both end portions in the longitudinal direction (i.e., the right-left direction in FIG. 1) of the porous portion 41. In FIG. 1, the separation membrane 12 is illustrated with bold lines. FIG. 1 omits illustration of the coating membrane 13 illustrated in FIG. 2. In FIG. 2, the porous portion 41, the dense portions 42, and the separation membrane 12 are cross-hatched, and the coating membrane 13 is illustrated with the bold line. In the illustration in FIG. 2, the dense portions 42, the separation membrane 12, and the coating membrane 13 are thicker than their actual thicknesses. Similarly, in the illustration in FIG. 3, the separation membrane 12 is thicker than its actual thickness.

In the example illustrated in FIG. 1, the porous portion 41 of the support 11 is an approximately column-like integrally-molded member. The porous portion 41 has a plurality of through holes 111 each extending in the longitudinal direction. That is, the porous portion 41 is a so-called monolithic member. For example, the porous portion 41 may have an approximately column-like outside shape. The porous portion 41 is a porous member having pores that allow passage of gas and liquid. Each through hole 111 (i.e., each cell) may have, for example, an approximately circular section perpendicular to the longitudinal direction. In the illustration in FIG. 1, the through holes 111 have a diameter greater than their actual diameter, and the number of through holes 111 is smaller than the actual number.

The length of the porous portion 41 (i.e., the length in the right-left direction in FIG. 1) may be in the range of, for example, 10 cm to 200 cm. The outer diameter of the porous portion 41 may be in the range of, for example, 0.5 cm to 30 cm. The distance between the central axes of each pair of adjacent through holes 111 may be in the range of, for example, 0.3 mm to 10 mm. The surface roughness (Ra) of the porous portion 41 may be in the range of, for example, 0.1 μm to 5.0 μm and preferably in the range of 0.2 μm to 2.0 μm. Note that the porous portion 41 may have any other shape such as a honeycomb shape, a flat plate-like shape, a tube-like shape, a cylinder-like shape, a column-like shape, or a polygonal shape. In the case where the porous portion 41 has a tube- or cylinder-like shape, the thickness of the porous portion 41 may be in the range of, for example, 0.1 mm to 10 mm.

The material for the porous portion 41 may be any of various substances (e.g., ceramic or metal) as long as the substance has chemical stability in the process of forming the separation membrane 12 on the surface. In the present embodiment, the porous portion 41 is formed of a ceramic sintered body. Examples of the ceramic sintered body selected as the material for the porous portion 41 include alumina, silica, mullite, zirconia, titania, yttria, silicon nitride, and silicon carbide. In the present embodiment, the porous portion 41 contains at least one type selected from among alumina, silica, and mullite.

The porous portion 41 may contain an inorganic binding material. The inorganic binding material may be at least one selected from among titania, mullite, easily sinterable alumina, silica, glass frit, clay minerals, and easily sinterable cordierite.

A mean pore diameter of the porous portion 41 may be in the range of, for example, 0.01 μm to 70 μm and preferably in the range of 0.05 μm to 25 μm. A mean pore diameter of the porous portion 41 in the vicinity of the surface where the separation membrane 12 is formed is in the range of 0.01 μm to 1 μm and preferably in the range of 0.05 μm to 0.5 μm. The mean pore diameter may be measured by, for example, a mercury porosimeter, a perm porometer, or a nano-perm porometer. Referring to the pore size distribution of the whole of the porous portion 41 including the surface and the interior, D5 may be in the range of, for example, 0.01 μm to 50 μm, D50 may be in the range of, for example, 0.05 μm to 70 μm, and D95 may be in the range of, for example, 0.1 μm to 2000 μm. The porosity of the porous portion 41 in the vicinity of the surface where the separation membrane 12 is formed may be in the range of, for example, 20% to 60%.

The porous portion 41 may have, for example, a multilayer structure obtained by laminating a plurality of layers having different mean pore diameters in the thickness direction. The mean pore diameter and sintered particle diameter in a surface layer that includes the surface where the separation membrane 12 is formed are smaller than the mean pore diameter and sintered particle diameter in the other layers. The mean pore diameter in the surface layer of the porous portion 41 may be in the range of, for example, 0.01 μm to 1 μm and preferably in the range of 0.05 μm to 0.5 μm. In the case where the porous portion 41 has a multilayer structure, the material for each layer may be any of the substances described above. The layers in the multilayer structure may be formed of the same material, or may be formed of different materials.

The dense portions 42 are membranous or thin plate-like members fixed to both end portions in the longitudinal direction of the porous portion 41. At each end portion in the longitudinal direction of the porous portion 41, the dense portions 42 coat and seal the end face in the longitudinal direction of the porous portion 41, the outside surface in the vicinity of that end face, and the inside surface of each through hole 111 in the vicinity of that end face. For example, the dense portions 42 may be nonporous members that substantially have no pores. Preferably, the dense portions 42 may have high strength and high resistance to heat and chemicals.

The dense portions 42 may be formed of, for example, glass, ceramic, metal, or resin. In the present embodiment, the dense portions 42 are formed of glass. For example, the dense portions 42 may be glass membranes formed on the surface of the porous portion 41 by firing. The dense portions 42 may have an average thickness of, for example, 1 μm to 1000 μm. The dense portions 42 may be formed by, for example, depositing glass frit on the surface of the porous portion 41 and firing the glass frit together with the porous portion 41. The formation of the dense portions 42 may be performed in parallel with the formation of the separation membrane 12, or may be performed before or after the formation of the separation membrane 12. Note that the material and shape of the dense portions 42 may be approximately changed. For example, the dense portions 42 may be porous members having pores whose mean pore diameter is smaller than that in the surface layer of the porous portion 41.

The inflow and outflow of gas and liquid substantially do not occur in the regions where the dense portions 42 are provided, and even if they occur, there is only a mere amount of inflow and outflow. That is, the dense portions 42 serve as sealers that are arranged continuous to the porous portion 41 and that substantially prevent the inflow and outflow of gas and liquid into and out of the porous portion 41. Note that the portions of the dense portions 42 that cover the end faces in the longitudinal direction of the porous portion 41 have a plurality of openings that overlap the through holes 111 of the porous portion 41. Thus, both ends in the longitudinal direction of each through hole 111 are not coated with the dense portions 42 and allow the inflow and outflow of gas and liquid into and out of the through hole 111.

The separation membrane 12 is an approximately cylinder-like membrane formed on approximately the entire inside surfaces of the through holes 111 of the porous portion 41. The end portions in the longitudinal direction of the separation membrane 12 are in contact with the dense portions 42 on the inside surfaces of the through holes 111, the dense portions 42 covering the end portions in the longitudinal direction of these inside surfaces. That is, the separation membrane 12 covers approximately the entire region of the inside surfaces of the through holes 111 that are not covered with the dense portions 42. In the example illustrated in FIG. 2, the edge in the longitudinal direction of the separation membrane 12 is in contact with the edge in the longitudinal direction of the dense portion 42, so that the end portion in the longitudinal direction of the separation membrane 12 and the end portion in the longitudinal direction of the dense portion 42 hardly overlap in the radial direction of the through holes 111 (i.e., the up-down direction in FIG. 2).

The separation membrane 12 is a dense porous membrane with micropores. The separation membrane 12 is capable of separating a specific substance from a mixture of substances in which a plurality of types of substances are mixed. In the case where the dense portion 42 is a porous member, the separation membrane 12 has a greater mean pore diameter than the dense portion 42. In other words, the dense portion 42 is denser than the separation membrane 12. In the case where the dense portion 42 is a porous member and if the dense portion 42 is used to separate the aforementioned specific substance from the aforementioned mixture of substances, the permeance to the specific substance is 1/10 or less (preferably 1/100 or less) than that when the separation membrane 12 is used for separation. Preferably, the dense portion 42 may be a nonporous member that is much denser than the separation membrane 12 and substantially do not allow the passage of the specific substance.

In the present embodiment, the separation membrane 12 is a zeolite membrane. The zeolite membrane as used herein refers to at least a membrane obtained by forming a zeolite in membranous form on the surface of the support 11, and does not include a membrane obtained by simply dispersing zeolite particles in an organic membrane. As described above, the zeolite membrane is usable as the separation membrane for separating a specific substance from a mixture of substances. The separation membrane 12 is less permeable to other substances than to the specific substance. In other words, the permeance of the zeolite membrane to the other substances is lower than the permeance of the zeolite membrane to the aforementioned specific substance. Note that the zeolite membrane may include two or more types of zeolites having different structures or different compositions.

The thickness of the separation membrane 12 may be in the range of, for example, 0.05 μm to 30 μm, preferably in the range of 0.1 μm to 20 μm, and more preferably in the range of 0.5 μm to 10 μm. Increasing the thickness of the separation membrane 12 improves separation performance. Reducing the thickness of the separation membrane 12 increases permeance. The surface roughness (Ra) of the separation membrane 12 may, for example, be less than or equal to m, preferably less than or equal to 2 μm, more preferably less than or equal to 1 μm, and yet more preferably less than or equal to 0.5 μm.

The pore diameter of zeolite crystals contained in the separation membrane 12 (hereinafter, also simply referred to as the "pore diameter in the separation membrane 12") is greater than or equal to 0.2 nm and less than or equal to 0.8 nm, preferably greater than or equal to 0.3 nm and less than or equal to 0.7 nm, and more preferably greater than or equal to 0.3 nm and less than or equal to 0.5 nm. If the pore diameter in the separation membrane 12 is less than 0.2 nm, the amount of substances that permeate through the separation membrane 12 may be reduced, whereas if the pore diameter in the separation membrane 12 is greater than 0.8 nm, the separation membrane 12 may have inadequate substance selectivity. The pore diameters in the separation membrane 12 refer to the diameters (i.e., minor axis) of the pore in a direction approximately perpendicular to the maximum diameter (i.e., the major axis that is the maximum value for the distance between oxygen atoms) of the pore in the zeolite crystals that configure the separation membrane 12. The pore diameter in the separation membrane 12 is smaller than the mean pore diameter in the surface of the porous portion 41 of the support 11 where the separation membrane 12 is formed.

In the case where the separation membrane 12 is composed of a zeolite in which an n-membered ring is maximum, the minor axis of the n-numbered ring pore is assumed to be the pore diameter of the separation membrane 12. In the case where the zeolite has a plurality of types of n-membered ring pores where n is the same number, the minor axis of an n-membered ring pore that has a largest minor axis is assumed to be the pore diameter of the separation membrane 12. Note that the n-membered ring refers to a portion in which n oxygen atoms constitute the framework of a pore and each oxygen atom is bonded to T atoms described later to form a cyclic structure. The n-membered ring also refers to a portion that forms a through hole (channel), and does not refer to a portion that does not form a through hole. The n-membered ring pore refers to a small pore formed of an n-membered ring. From the viewpoint of improving selectivity, the aforementioned separation membrane 12 may preferably contain a maximum 8- or less-membered ring zeolite (e.g., 6- or 8-membered ring zeolite).

The pore diameter of the separation membrane 12, which is a zeolite membrane, is uniquely determined by the framework structure of the zeolite and can be obtained from a value disclosed in "Database of Zeolite Structures" by the International Zeolite Association, [online], from the Internet <URL.http://www.iza-structure.org/databases/>.

There are no particular limitations on the type of the zeolite of the separation membrane 12, and examples of the zeolite include AEI-, AEN-, AFN-, AFV-, AFX-, BEA-, CHA-, DDR-, ERI-, ETL-, FAU- (X-type, Y-type), GIS-, IHW-, LEV-, LTA-, LTJ-, MEL-, MFI-, MOR-, PAU-, RHO-, SOD-, and SAT-type zeolites. In the case where the zeolite is an 8-membered ring zeolite, examples of the zeolite include AEI-, AFN-, AFV-, AFX-, CHA-, DDR-, ERI-, ETL-, GIS-, IHW-, LEV-, LTA-, LTJ-, RHO-, and SAT-type zeolites.

The zeolite of the separation membrane 12 may contain, for example, at least one type selected from among silicon (Si), aluminum (Al), and phosphorus (P) as T atoms (i.e., atoms located in the center of oxygen tetrahedrons ($TO_4$) constituting the zeolite). The zeolite of the separation membrane 12 may, for example, be a zeolite that contains only Si or both Si and Al as the T atoms, an AlPO-type zeolite that contains Al and P as the T atoms, an SAPO-type zeolite that contains Si, Al, and P as the T atoms, an MAPSO-type zeolite that contains magnesium (Mg), Si, Al, and P as the T atoms, or a ZnAPSO-type zeolite that contains zinc (Zn), Si, Al, and P as the T atoms. Some of the T atoms may be replaced by other elements.

The separation membrane 12 may contain, for example, Si. For example, the separation membrane 12 may contain any two or more of Si, Al, and P. The separation membrane 12 may contain alkali metal. The alkali metal may, for example, be sodium (Na) or potassium (K). In the case where the separation membrane 12 contains Si atoms and Al atoms, the Si/Al ratio in the separation membrane 12 may, for example, be higher than or equal to one and lower than or equal to a hundred thousand. The Si/Al ratio refers to the molar ratio of Si elements to Al elements contained in the separation membrane 12. The Si/Al ratio may preferably be higher than or equal to 5, more preferably higher than or equal to 20, and yet more preferably higher than or equal to 100, and a higher Si/Al ratio is more preferable. The Si/Al ratio in the separation membrane 12 may be adjusted by adjusting, for example, the compounding ratio of an Si source and an Al source in a starting material solution, which will be described later.

Note that the separation membrane 12 in the separation membrane complex 1 may further include different membranes other than the zeolite membrane, in addition to the zeolite membrane. Alternatively, the separation membrane 12 may be a membrane other than the zeolite membrane.

The coating membrane 13 is a membranous member that coats approximately the whole of the boundary portion 45 between the dense portion 42 and the separation membrane 12 in each through hole 111. In the example illustrated in FIG. 2, the boundary portion 45 between the dense portion 42 and the separation membrane 12 refers to an approximately circumferential region in which the edge in the longitudinal direction of the dense portion 42 is in contact with the separation membrane 12. As illustrated in FIG. 2, in the case where the approximately circumferential region (i.e., contact part) in which the edge in the longitudinal direction of the dense portion 42 is in contact with the separation membrane 12 is directly coated with the separation membrane 12, the boundary portion 45 is assumed to be an approximately circumferential region in which a plane that extends from the contact part in a direction perpendicular to the surface of the porous portion 41 (i.e., in the direction of the normal to the surface of the porous portion 41) intersects with the surface of the separation membrane 12. The coating membrane 13 is a member that includes an approximately cylindrical portion provided along the entire circumference of the inside surface of each through hole 111 on the boundary portion 45 between the separation membrane 12 and the dense portion 42. The coating membrane 13 may extend to both sides in the longitudinal direction from the boundary portion 45. Moreover, the coating membrane 13 may continuously expand in the longitudinal direction from above the end portion in the longitudinal direction of the separation membrane 12 to the dense portion 42 and coats the end portion in the longitudinal direction of the dense portion 42.

In the example illustrated in FIG. 2, the coating membrane 13 extends 1 mm to 5 mm in the longitudinal direction from the boundary portion 45 toward the separation membrane 12. The coating membrane 13 also coats approximately the entire surface of the dense portion 42 on the inside surface of the through hole 111. In the example illustrated in FIG. 2, the coating membrane 13 extends from the boundary portion 45 to above the end surface in the longitudinal direction of the support 11 (i.e., the end face in the longitudinal direction of the dense portion 42), but it does not necessarily have to extend to above that end face. Alternatively, the edge of the coating membrane 13 on the side close to the dense portion 42 may be located between the boundary portion 45 and the end face in the longitudinal direction of the support 11.

Figure 4A:
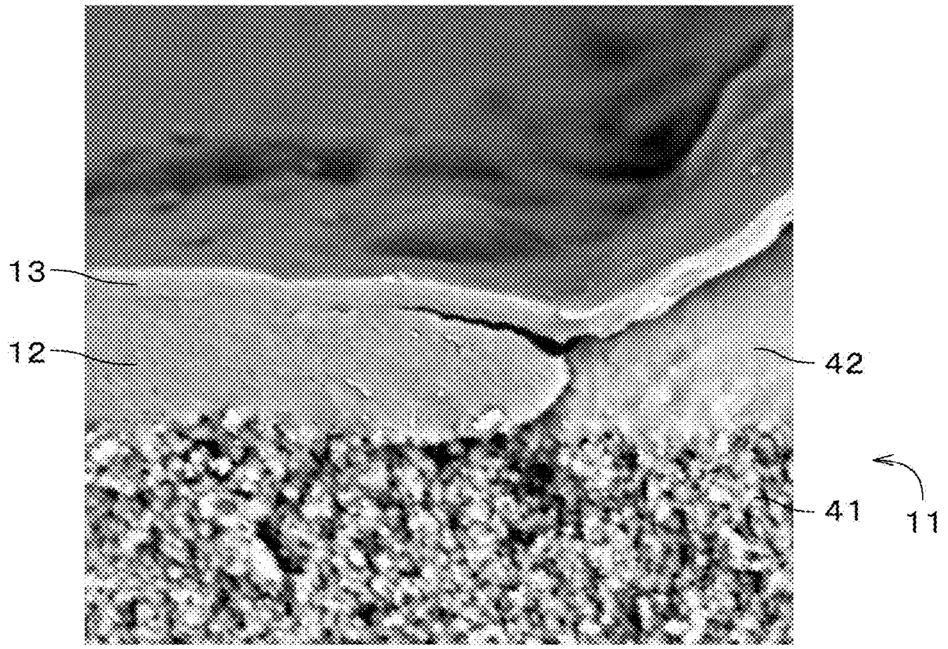
FIG. 4A shows an SEM image of a section in the vicinity of a coating membrane.
Figure 4B:
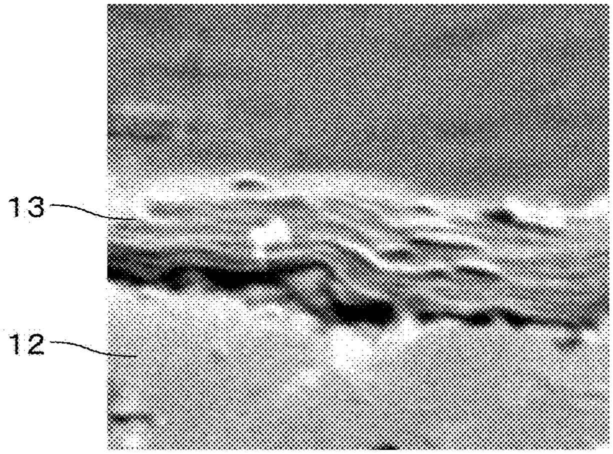
FIG. 4B shows an SEM image of a section in the vicinity of the coating membrane in enlarged dimensions.

FIG. 4A shows a scanning electron microscope (SEM) image of a section in the vicinity of the coating membrane 13 of the separation membrane complex 1. FIG. 4B shows an SEM image of the coating membrane 13 in FIG. 4A in enlarged dimensions. As illustrated in FIGS. 4A and 4B, the coating membrane 13 is a membranous member that has a layered microstructure formed of a layered inorganic compound. The layered inorganic compound as used herein refers to an inorganic compound having a layered structure. In other words, in the case where the section of the coating membrane 13 is observed by an SEM or a transmission electron microscope (TEM), it is determined from the observed layered microstructure that the coating membrane 13 is formed of a layered inorganic compound. The layered structure refers to a structure in which sheet structures in which atoms are strongly bonded together and densely aligned by, for example, covalent or ion bonding are stacked approximately parallel to the thickness direction by a weak binding force such as the van der Waals force, or may be a structure with high flatness in which the aforementioned sheet structures are stacked in the thickness direction and bound together by ions or molecules. In the coating membrane 13 illustrated in FIGS. 4A and 4B, a large number of sheet structures are stacked in layers in the up-down direction in the drawings. Each sheet structure may have a thickness of, for example, 0.3 nm to 10 nm.

Examples of the layered inorganic compound forming the coating membrane 13 include clay minerals, layered metal oxides, layered double hydroxides, layered phosphate, and layered carbon. Examples of the clay minerals include pyrophyllite, mica, smectite, vermiculite, chlorite, kaolinite, halloysite, talc, and any other layered silicate. Examples of the layered metal oxides include layered titanate, layered niobate, layered manganese oxides, and layered perovskite. Examples of the layered phosphates include α-type zirconium phosphate, γ-type zirconium phosphate, α-type titanium phosphate, γ-type titanium phosphate, and aluminum triphosphate. Examples of the layered carbons include graphite, graphene, and graphene oxides.

Preferably, the layered inorganic compound forming the coating membrane 13 may be either a clay mineral or a layered metal oxide and more preferably a clay mineral. Yet more preferably, the layered inorganic compound forming the coating membrane 13 may be smectite. Examples of the smectite include montmorillonite, beidellite, nontronite, saponite, hectorite, stevensite, and sauconite.

It is preferable that the coating membrane 13 is substantially impermeable to gas and liquid, and even if the coating membrane 13 allows passage of gas and liquid, there is only a mere amount of permeation. In the case where the coating membrane 13 is a porous member and if the coating membrane 13 is used to separate the aforementioned specific substance from the aforementioned mixture of substances, the permeance to the specific substance is less than or equal to that when the separation membrane 12 is used for separation (preferably, 1/10 or less and more preferably 1/100 or less). Preferably, the coating membrane 13 may be a nonporous member that is much denser than the separation membrane 12 and that is substantially impermeable to the specific substance. The coating membrane 13 may preferably have high strength and high resistance to heat and chemicals. Note that either of the coating membrane 13 and the dense portions 42 may be denser than the other, or they may have the same degree of denseness.

The coating membrane 13 may have an average thickness of, for example, greater than or equal to 0.002 μm and preferably greater than or equal to 0.01 μm. The average thickness of 0.002 μm improves the denseness of the coating membrane 13 and favorably suppresses the permeance of substances such as gas or liquid through the coating membrane 13. The average thickness of greater than or equal to 0.01 μm further improves the denseness of the coating membrane 13. There are no particular limitations on the upper limit for the average thickness of the coating membrane 13, and the upper limit for the average thickness may, for example, be less than or equal to 10 μm and preferably less than or equal to 5 μm. The average thickness of less than or equal to 10 μm suppresses the occurrence of defects such as cracks in the coating membrane 13. The average thickness of less than or equal to 5 μm further suppresses the occurrence of defects. The average thickness of the coating membrane 13 may be obtained by observation of a section with an SEM or TEM.

Figure 5:
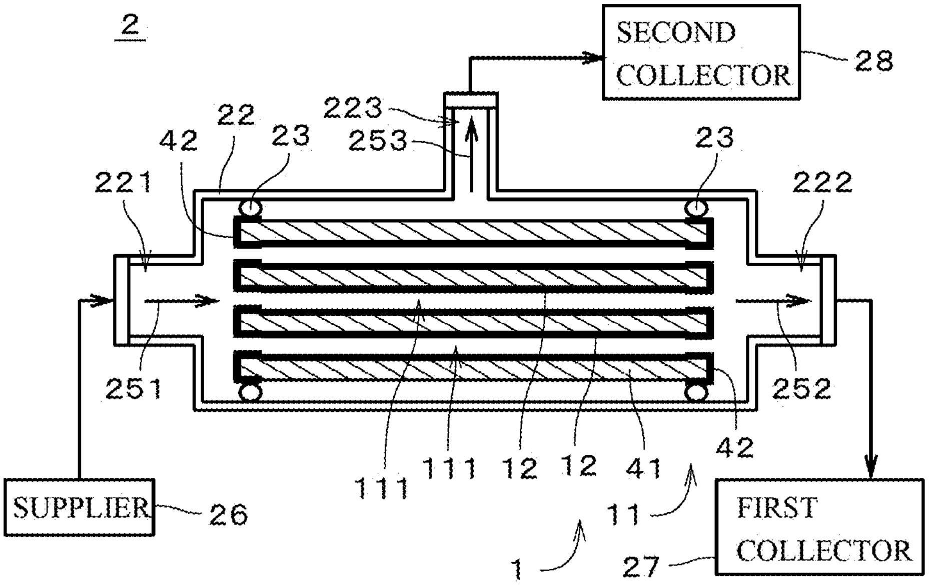
FIG. 5 is an illustration of a separation apparatus.
Figure 6:
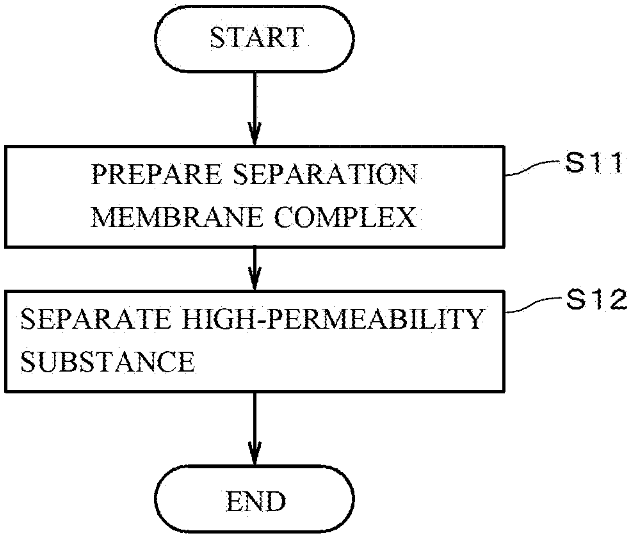
FIG. 6 is a flowchart of separation of a mixture of substances.

Next, the separation of a mixture of substances using the separation membrane complex 1 will be described with reference to FIGS. 5 and 6. FIG. 5 is an illustration of the separation apparatus 2. FIG. 6 is a flowchart of the separation of a mixture of substances using the separation apparatus 2.

In the separation apparatus 2, a mixture of substances that includes a plurality of types of fluid (i.e., gas or liquid) is supplied to the separation membrane complex 1, and a substance with high permeability in the mixture of substances is separated from the mixture of substances by allowing the substance with high permeability to permeate through the separation membrane complex 1. For example, the separation using the separation apparatus 2 may be performed for the purpose of extracting a substance with high permeability (hereinafter, also referred to as a "high-permeability substance") from the mixture of substances or for the purpose of concentrating a substance with lower permeability (hereinafter, also referred to as a "low-permeability substance").

The mixture of substances (i.e., a fluid mixture) may be a mixed gas that includes a plurality of types of gas, may be a mixed solution that includes a plurality of types of liquid, or may be a gas-liquid two-phase fluid that includes both gas and liquid.

The mixture of substances may include, for example, one or more types of substances selected from among hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde. The aforementioned high-permeability substance may, for example, be one or more types of substances selected from among $H_2$, He, $N_2$, $O_2$, $H_2O$, $CO_2$, $NH_3$, and $H_2S$.

Nitrogen oxides are compounds of nitrogen and oxygen. For example, the aforementioned nitrogen oxides may be gas called NOx such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxides are compounds of sulfur and oxygen. For example, the aforementioned sulfur oxides may be gas called $SO_x$ such as sulfur dioxide ($SO_2$) or sulfur trioxide ($SO_3$).

Sulfur fluorides are compounds of fluorine and sulfur. For example, the aforementioned sulfur fluorides may be disulfur difluoride (F—S—S—F, $S{=}SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons that contain one or more and eight or less carbon atoms. C3 to C8 hydrocarbons each may be any of a linear-chain compound, a side-chain compound, and a cyclic compound. C2 to C8 hydrocarbons each may be either of a saturated hydrocarbon (i.e., where double bonds and triple bonds are not located in molecules) and an unsaturated hydrocarbon (i.e., where double bonds and/or triple bonds are located in molecules). C1 to C4 hydrocarbons may, for example, be methane ($CH_4$), ethane ($C_2H_6$), ethylene ($C_2H_4$), propane ($C_3H$), propylene ($C_3H_6$), normal butane ($CH_3(CH_2)_2CH_3$), isobutene ($CH(CH_3)_3$), 1-butene ($CH_2{=}CHCH_2CH_3$), 2-butene ($CH_3CH{=}CHCH_3$), or isobutene ($CH_2{=}C(CH_3)_2$).

The aforementioned organic acid may, for example, be carboxylic acid or sulfonic acid. The carboxylic acid may, for example, be formic acid ($CH_2O_2$), acetic acid ($C_2H_4O_2$), oxalic acid ($C_2H_2O_4$), acrylic acid ($C_3H_4O_2$), or benzoic acid ($C_6H_5COOH$). The sulfonic acid may, for example, be ethane sulfonic acid ($C_2H_6O_3S$). The organic acid may be a chain compound, or may be a cyclic compound.

The aforementioned alcohol may, for example, be methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

Mercaptans are organic compounds with terminal sulfur hydrides (SH) and are substances called also thiol or thioalcohol. The aforementioned mercaptans may, for example, be methyl mercaptan ($CH_3SH$), ethyl mercaptan ($C_2H_5SH$), or 1-propane thiol ($C_3H_7SH$).

The aforementioned ester may, for example, be formic acid ester or acetic acid ester.

The aforementioned ether may, for example, be dimethyl ether ($(CH_3)_2O$), methyl ethyl ether ($C_2H_5OCH_3$), or diethyl ether ($(C_2H_5)_2O$).

The aforementioned ketone may, for example, be acetone ($(CH_3)_2CO$), methyl ethyl ketone ($C_2H_5COCH_3$), or diethyl ketone ($(C_2H_5)_2CO$).

The aforementioned aldehyde may, for example, be acetaldehyde ($CH_3CHO$), propionaldehyde ($C_2H_5CHO$), or butanal (butyraldehyde) ($C_3H_7CHO$).

The following description is given on the assumption that the mixture of substances that is subjected to the separation by the separation apparatus 2 is a mixed gas that includes a plurality of types of gas.

The separation apparatus 2 includes the separation membrane complex 1, an outer cylinder 22, two seal members 23, a supplier 26, a first collector 27, and a second collector 28. The separation membrane complex 1 and the seal members 23 are placed in the outer cylinder 22. The supplier 26, the first collector 27, and the second collector 28 are disposed outside the outer cylinder 22 and connected to the outer cylinder 22.

There are no particular limitations on the shape of the outer cylinder 22, and the outer cylinder 22 may, for example, be an approximately cylindrical tube-like member. For example, the outer cylinder 22 may be formed of stainless steel or carbon steel. The longitudinal direction of the outer cylinder 22 is approximately parallel to the longitudinal direction of the separation membrane complex 1. One end in the longitudinal direction of the outer cylinder 22 (i.e., the end on the left side in FIG. 5) has a supply port 221, and the other end thereof has a first exhaust port 222. The side face of the outer cylinder 22 has a second exhaust port 223. The supply port 221 is connected to the supplier 26. The first exhaust port 222 is connected to the first collector 27. The second exhaust port 223 is connected to the second collector 28. The internal space of the outer cylinder 22 is an enclosed space isolated from the space around the outer cylinder 22.

The two seal members 23 are arranged along the entire circumference between the outside surface of the separation membrane complex 1 and the inside surface of the outer cylinder 22 in the vicinity of the both end portions in the longitudinal direction of the separation membrane complex 1. Each seal member 23 is an approximately ring-shaped member formed of a material that is impermeable to gas and liquid. For example, the seal members 23 may be O-rings formed of resin having flexibility. The seal members 23 are in tight contact with the outside surface of the separation membrane complex 1 and the inside surface of the outer cylinder 22 along the entire circumference. In the example illustrated in FIG. 5, the seal members 23 are in tight contact with the regions of the outside surface of the support 11 of the separation membrane complex 1 in which the porous portion 41 is covered with the dense portions 42. Note that the coating membrane 13 may be formed on the regions of the dense portions 42 where the seal members 23 are provided. In other words, the seal members 23 and the dense portions 42 may be in tight contact with each other via the coating membrane 13. The part between the seal members 23 and the outside surface of the separation membrane complex 1 and the part between the seal members 23 and the inside surface of the outer cylinder 22 are sealed so as to almost or completely disable the passage of gas and liquid.

The supplier 26 supplies the mixed gas to the internal space of the outer cylinder 22 via the supply port 221. The supplier 26 may include, for example, a pumping mechanism such as a blower or a pump that pumps the mixed gas toward the outer cylinder 22. The pressure mechanism may include, for example, a temperature controller and a pressure regulator that respectively control the temperature and pressure of the mixed gas supplied to the outer cylinder 22. The first collector 27 and the second collector 28 may include, for example, a reservoir that stores gas delivered from the outer cylinder 22, or a blower or a pump that transfers this gas.

In the separation of the mixed gas, first, the separation membrane complex 1 is prepared (step S11 in FIG. 6). Specifically, the separation membrane complex 1 is prepared by being mounted on the inside of the outer cylinder 22. Then, the mixed gas including a plurality of types of gas having different permeability in the separation membrane 12 is supplied from the supplier 26 to the inside of the outer cylinder 22 as indicated by an arrow 251. For example, the mixed gas may be composed primarily of $CO_2$ and $CH_4$. The mixed gas may also include gas other than $CO_2$ and $CH_4$. The pressure of the mixed gas supplied from the supplier 26 to the inside of the outer cylinder 22 (i.e., feed pressure) may be in the range of, for example, 0.1 MPa to 20.0 MPa. The temperature of the mixed gas supplied from the supplier 26 may be in the range of, for example, 10° C. to 250° C.

The mixed gas supplied from the supplier 26 to the outer cylinder 22 is introduced from the left end of the separation membrane complex 1 in the drawing into each through hole 111 of the support 11. In other words, the mixed gas supplied from the supplier 26 is supplied to the separation membrane complex 1 in the outer cylinder 22. In the mixed gas, gas with high permeability, i.e., a high-permeability substance (e.g., $CO_2$), permeates through the separation membrane 12 formed on the inside surface of each through hole 111 and the porous portion 41 of the support 11, and is exhausted from the outside surface of the support 11. Accordingly, the high-permeability substance is separated from the mixed gas (step S12).

The gas exhausted out of the outside surface of the support 11 (hereinafter, referred to as the "permeated substance") is guided via the second exhaust port 223 to the second collector 28 as indicated by the arrow 253 and collected by the second collector 28. The pressure of the gas collected by the second collector 28 (i.e., permeate pressure) may, for example, be 0.0 MPaG. The permeated substance may further include, in addition to the aforementioned high-permeability substance, gases with low permeability in the mixed gas, i.e., low-permeability substances (e.g., $CH_4$).

In the mixed gas, gas other than the substances that have permeated through the separation membrane 12 and the support 11 (hereinafter, also referred to as a "non-permeated substance") passes through each through hole 111 of the support 11 from the left to the right in the drawing and is collected via the first exhaust port 222 by the first collector 27 as indicated by an arrow 252. The pressure of the gas collected by the first collector 27 may, for example, be approximately the same as the feed pressure. The non-permeated substance may include, in addition to the aforementioned low-permeability substance, a high-permeability substance that has not permeated through the separation membrane 12. The non-permeated substance collected by the first collector 27 may, for example, be circulated into the supplier 26 and supplied again to the inside of the outer cylinder 22.

Next, one example of the procedure for producing the separation membrane complex 1 will be described with reference to FIG. 7. The following description is given of the method of producing the separation membrane complex 1 that includes a DDR-type zeolite membrane as the separation membrane 12. In the production of the separation membrane composite 1, first, the porous support 11 is formed to be prepared (step S21). In step S21, for example, starting materials that include a material for the aggregate of the support 11, a pore forming material, and a binder are prepared and mixed together. Then, water is poured into the starting material, and the starting material and water are kneaded in a kneader to prepare a green body. Then, the green body is molded by an extruder or any other means to obtain a compact with a plurality of through holes 111 (see FIG. 1). Note that the compact may be formed by any other molding method different from extrusion molding.

The compact is dried and debinded. Then, a material for the dense portions 42, such as glass frit, is deposited on regions of the compact where the dense portions 42 are to be formed. Thereafter, the compact with the material such as glass frit deposited thereon is fired to form the support 11. As described above, the support 11 includes the porous portion 41 and the dense portions 42 that are arranged continuously to the porous portion 41. That is, step S21 is the step of continuously forming and arranging the dense portions 42 and the porous portion 41 of the support 11. The temperature during firing of the surface layer of the compact (i.e., firing temperature) may be in the range of, for example, 1000° C. to 1500° C., and in the present embodiment, the firing temperature is 1250° C. The firing time may be in the range of, for example, one hour to 100 hours. The conditions for the firing of the compact may be appropriately changed. In step S21, the dense portions 42 that are arranged continuously to the porous portion 41 may be formed by first performing firing to form the porous portion 41 without depositing any material such as glass frit on the aforementioned compact and then depositing a material such as glass frit on the porous portion 41 and performing firing again.

In the production of the separation membrane complex 1, in parallel with or before or after step S21, seed crystals of a zeolite that is used to form the separation membrane 12 are synthesized to be prepared (step S22). In the synthesis of the seed crystals, a starting material solution of the seed crystals is prepared by dissolving or dispersing a starting material such as an Si source and a structure-directing agent (hereinafter, also referred to as the "SDA") in a solvent. Then, the starting material solution is subjected to hydrothermal synthesis, and obtained crystals are cleaned and dried so as to obtain zeolite powder (e.g., DDR-type zeolite powder). The zeolite powder may be used as-is as the seed crystals, or may be subjected to processing such as pulverization to obtain the seed crystals.

Then, the seed crystals are deposited on the inside surfaces of the through holes 111 of the support 11 (step S23). Specifically, the seed crystals are deposited on a region of the inside surface of each through hole 111 in which the porous portion 41 is exposed. The deposition of the seed crystals on the support 11 may be carried out by, for example, immersing the porous support 11 in a dispersion obtained by dispersing the seed crystals in a solvent (e.g., water or alcohol such as ethanol). The immersion of the support 11 in the dispersion may be repeated multiple times. Alternatively, the seed crystals may be deposited on the support 11 by any other technique different from the technique described above.

The support 11 with the seed crystals deposited thereon is immersed in a starting material solution. The starting material solution may be prepared by, for example, dissolving materials such as an Si source and an SDA in a solvent. The composition of the starting material solution may, for example, be 1.0 $SiO_2$:0.015 SDA:0.12 $(CH_2)_2(NH_2)_2$. The solvent in the starting material solution may, for example, be water or alcohol such as ethanol. In the case where water is used as the solvent of the starting material solution, the molar ratio of the SDA to the water contained in the starting material solution may preferably be lower than or equal to 0.01. The molar ratio of the SDA to the water contained in the starting material solution may also preferably be higher than or equal to 0.00001. The SDA contained in the starting material solution may, for example, be an organic compound. One example of the SDA is 1-adamantanamine.

Then, the DDR-type zeolite is grown by hydrothermal synthesis using the aforementioned seed crystals as nuclei so as to form the DDR-type separation membrane 12 on the porous portion 41 of the support 11 (step S24). The end portions in the longitudinal direction of the separation membrane 12 are in contact with the end portions in the longitudinal direction of the dense portions 42 as described above. The temperature during the hydrothermal synthesis may preferably be in the range of 120 to 200° C. and may, for example, be 130° C. The hydrothermal synthesis time may preferably be in the range of 5 to 100 hours and may, for example, be 15 hours.

When the hydrothermal synthesis is completed, the support 11 and the separation membrane 12 are washed with deionized water. After the washing, the support 11 and the separation membrane 12 are dried at, for example, 80° C. After the drying of the support 11 and the separation membrane 12, the separation membrane 12 is heat-treated so as to almost completely burn and remove the SDA in the separation membrane 12 and to allow micropores to penetrate through the separation membrane 12 (step S25).

In the method of producing the separation membrane complex 1, the formation of the dense portions 42 in step S21 may be performed after steps S22 to S25 (i.e., the formation of the separation membrane 12 on the porous portion 41). Moreover, step S25 may be omitted, depending on the condition of use of the SDA.

When steps S21 to S25 are completed, the coating membrane 13 formed of a layered inorganic compound is formed on the boundary portion 45 between the separation membrane 12 and the dense portion 42. Accordingly, the boundary portion 45 is coated with the coating membrane 13 (step S26).

In the formation of the coating membrane 13, first, the material for the coating membrane 13 (hereinafter, also referred to as the "coating membrane material") is dispersed in a solvent to prepare a dispersion. The coating membrane material as used herein is powder of a layered inorganic compound (e.g., a clay mineral such as smectite). In the dispersion, solvent molecules become embedded in between the layers of the layered inorganic compound so as to separate the layered inorganic compound into laminas. The dimension in the plane direction (i.e., the direction perpendicular to the thickness direction) of each lamina may, for example, be several tens of nanometers to several tens of micrometers. The type of the solvent is appropriately determined depending on the type of the material for the coating membrane 13. In the case where smectite is used as the material for the coating membrane 13, deionized water or the like may be usable as the solvent. The content of the coating membrane material in the dispersion is appropriately determined depending on, for example, the type of the coating membrane material and the thickness of the coating membrane 13 to be formed. The content of the coating membrane material may be in the range of, for example, 0.1% by mass to 10% by mass.

The dispersion is prepared and applied to the support 11 in which the separation membrane 12 is formed on the inside surfaces of the through holes 111. On the inside surfaces of the through holes 111, the dispersion is applied to the whole of the regions of the inside surfaces of the through holes 111 on which the coating membrane 13 is to be formed (i.e., regions including the boundary portions 45), and is not applied to the other regions. The application of the dispersion may be implemented by, for example, inserting and dipping the end portions in the longitudinal direction of the support 11 in the dispersion stored in a container (so-called dip coating). The application of the dispersion may also be implemented by any of various other methods different from dip coating. For example, the dispersion may be sprayed to the support 11 and the separation membrane 12, or the dispersion may be applied by a coater such as a brush.

Thereafter, the support 11 and the separation membrane 12 with the dispersion applied thereto are dried. The drying as used herein may, for example, be air drying or circulation drying in an environment at a temperate of 20° C. to 100° C. By drying the dispersion, the coating membrane 13 that covers the boundary portion 45 between the separation membrane 12 and the dense portion 42 is formed, and accordingly the separation membrane complex 1 described above is obtained.

In the production of the separation membrane complex 1, the separation membrane complex 1 (i.e., the support 11, the separation membrane 12, and the coating membrane 13) may be heat-treated at a temperature of higher than or equal to 200° C. after step S26 (step S27). This improves adhesion of the coating membrane 13 to the separation membrane 12 and the dense portions 42 and also improves the denseness of the coating membrane 13. The heating temperature during the heat treatment may, for example, be higher than or equal to 200° C. and lower than or equal to 1000° C., preferably higher than or equal to 250° C. and lower than or equal to 800° C., and more preferably higher than or equal to 300° C. and lower than or equal to 600° C. The heating time during the heat treatment may be in the range of, for example, one hour to 100 hours. The heat treatment may be implemented by placing and heating the separation membrane complex 1 in, for example, a dryer or an electric furnace. The heat treatment may also be implemented by various other methods. The atmosphere during the heat treatment may, for example, be an ambient atmosphere, an oxygen atmosphere, or an inert gas atmosphere.

Next, the relationship between the presence or absence of the coating membrane 13 and the separation performance of the separation membrane complex 1 will be described with reference to Table 1. In Table 1, the separation membrane complexes 1 according to Examples 1 to 3 were each a separation membrane complex that includes the coating membrane 13 described above. The separation membrane complex according to Comparative Example 1 was a separation membrane complex that does not include the coating membrane 13 (i.e., in which the boundary portion 45 between the separation membrane 12 and the dense portion 42 is exposed).

The $CO_2$ permeance and $CH_4$ permeance of the separation membrane complex 1 were obtained by the above-described separation apparatus 2 supplying a mixed gas of $CO_2$ and $CH_4$ from the supplier 26 to the separation membrane complex 1 in the outer cylinder 22. The unit of the permeance was [nmol/($m^2$·s·Pa)]. The $CO_2$ concentration in the mixed gas was 50% by volume, and the $CH_4$ concentration was 50% by volume. The pressure of the mixed gas supplied from the supplier 26 to the separation membrane complex 1 (i.e., the feed pressure) was 0.3 MPaG. The pressure of permeated gas that has permeated through the separation membrane complex 1 (i.e., the permeate pressure) was 0 MPaG. The $CO_2$ permeance and the $CH_4$ permeance were obtained by meaning the permeated gas by a mass flow meter (MFM) and a gas chromatograph. Then, the $CO_2$ permeance was divided by the $CH_4$ permeance so as to obtain the ratio of the $CO_2$ permeance to the $CH_4$ permeance (i.e., $CO_2/CH_4$ permeance ratio).

TABLE 1

| | Coating Membrane | Coating Membrane Material | Permeance Ratio Coefficient |
|---|---|---|---|
| Comparative Example 1 | No | — | 1.0 |
| Example 1 | Yes | Smectite | 1.6 |
| Example 2 | Yes | Smectite | 1.6 |
| Example 3 | Yes | Bentonite | 1.3 |

The permeance ratio coefficient in Table 1 indicates the ratio among the $CO_2/CH_4$ permeance ratios in Examples 1 to 3, using the $CO_2/CH_4$ permeance ratio in Comparative Example 1 as a reference (i.e., 1.0). In other words, the permeance ratio coefficient indicates the value obtained by dividing the $CO_2/CH_4$ permeance ratio in each of Examples 1 to 3 by the $CO_2/CH_4$ permeance ratio in Comparative Example 1.

The separation membrane complex according to Comparative Example 1 was produced by the production method indicated in steps S21 to S25 described above. The porous portion 41 of the support 11 was a monolithic porous alumina base material. The dense portions 42 were membranes formed of glass. The separation membrane 12 was a DDR-type zeolite membrane. The hydrothermal synthesis temperature and the hydrothermal synthesis time in step S24 were 130° C. and 15 hours, respectively. In step S25, the SDA was removed by heating at 450° C. for 50 hours.

The separation membrane complex 1 according to Example 1 was produced by performing steps S26 and S27 described above for the separation membrane complex according to Comparative Example 1. The dispersion used in step S26 was prepared by using clay mineral "Sumecton-SA" (KUNIMINE Industries Co., Ltd) as the coating membrane material and dispersing the coating membrane material in deionized water. Sumecton-SA was a synthetic smectite composed primarily of saponite. The content of the coating membrane material in the dispersion was set to 1% by mass. The heating temperature and the heating time during the heat treatment in step S27 were 200° C. and 20 hours, respectively. The permeance ratio coefficient was 1.6, and this indicates that the separation performance of the separation membrane complex 1 is improved as compared with that in Comparative Example 1 that did not include the coating membrane 13. The improvement of the separation performance was achieved as a result of the coating membrane 13 coating (i.e., repairing) defects such as cracks in the boundary portion 45 between the separation membrane 12 and the dense portions 42 and thereby suppressing leakage of $CH_4$ from the defects. The coating membrane 13 had a thickness of 0.8 μm.

Example 2 was similar to Example 1, except that the coating membrane material was changed to "Sumecton-SWN" (KUNIMINE Industries Co., Ltd), which was a clay mineral. Sumecton-SWN was synthetic smectite composed primarily of hectorite. The permeance ratio coefficient was 1.6, and this indicates that the separation performance of the separation membrane complex 1 was improved as compared with that in Comparative Example 1 that did not include the coating membrane 13. The coating membrane 13 had a thickness of 2.0 μm.

Example 3 was similar to Example 1, except that the coating membrane material was changed to "Kunipia-F" (KUNIMINE Industries Co., Ltd), which was a clay mineral. Kunipia-F was refined bentonite composed primarily of montmorillonite. The permeance ratio coefficient was 1.3, and this indicates that the separation performance of the separation membrane complex 1 was improved as compared with that in Comparative Example 1 that did not include the coating membrane 13. The coating membrane 13 had a thickness of 0.5 μm.

As a result of measuring the permeance ratio coefficient in the same manner as described above, the permeance ratio coefficient remained unchanged after the separation membrane complexes 1 according to Examples 1 to 3 were heated at 400° C. for one hour. This indicates that the coating membranes 13 of the separation membrane complexes 1 according to Examples 1 to 3 have high heat resistance.

As described above, the separation membrane complex 1 includes the support 11, the separation membrane 12, and the coating membrane 13. The support 11 includes the porous portion 41 and the dense portions 42 that are arranged continuously. The separation membrane 12 is provided on the porous portion 41 of the support 11. The end portion of the separation membrane 12 is in contact with the dense portions 42. The coating membrane 13 is composed by a layered inorganic compound. The coating membrane 13 coats the boundary portions 45 between the dense portions 42 and the separation membrane 12. In the separation membrane complex 1, since the coating membrane 13 coats (i.e., repairs) defects such as cracks in the boundary portion 45 between the separation membrane 12 and the dense portions 42, it is possible to reduce the possibility that the aforementioned low-permeability substance may leak out of defects and may be included in permeated substances. As a result, the separation performance of the separation membrane complex 1 is improved as indicated by Examples 1 to 3. Besides, the use of the layered inorganic compound as the coating membrane material allows easy formation of the dense coating membrane 13 as compared with the case where the coating membrane is formed of a zeolite. As a result, it is possible to easily produce the separation membrane complex 1.

As described above, the layered inorganic compound may preferably be either a clay mineral or a layered metal oxide. This improves the heat resistance of the coating membrane 13.

As described above, the layered inorganic compound may more preferably be a clay mineral. This further facilitates the formation of the coating membrane 13. Since clay minerals are easily available and relatively inexpensive, the production cost of the separation membrane complex 1 can be reduced.

As described above, the layered inorganic compound may more preferably be smectite (Examples 1 and 2). This further improves the denseness of the coating membrane 13 and further improves the separation performance of the separation membrane complex 1 as compared with the case where the layered inorganic compound is composed of bentonite (Example 3).

As described above, the average thickness of the coating membrane 13 may preferably be greater than or equal to 0.002 μm. This improves the denseness of the coating membrane 13 and favorably reduces the possibility that substances such as gas and liquid permeate thorough the coating membrane 13. As a result, it is possible to favorably improve the separation performance of the separation membrane complex 1.

As described above, the separation membrane 12 may preferably be a zeolite membrane. By configuring the separation membrane 12 with zeolite crystals that have uniform pore size, it is possible to favorably achieve selective permeation of substances targeted for permeation. As a result, the substances targeted for permeation can be separated from a mixture of substances with high efficiency.

As described above, the separation apparatus 2 includes the separation membrane complex 1 described above, and the supplier 26 that supplies a mixture of substances including a plurality of types of gas or liquid to the separation membrane complex 1. The separation membrane complex 1 separates a substance with high permeability (i.e., a high-permeability substance) in the mixture of substances from the mixture of substances by allowing the high-permeability substance to permeate through the separation membrane complex 1. This separation apparatus 2 is capable of separating the high-permeability substance from the mixture of substances at a higher permeance ratio.

The separation method described above includes the step of preparing the separation membrane complex 1 described above (step S11), and the step of supplying a mixture of substances that includes a plurality of types of gas or liquid to the separation membrane complex 1 and separating a substance with high permeability (i.e., a high-permeability substance) in the mixture of substances from the mixture of substances by allowing the high-permeability substance to permeate through the separation membrane complex 1 (step S12). Accordingly, the high-permeability substance can be separated at a high permeance ratio from the mixture of substances.

The separation method is in particular suitable for cases in which the mixture of substances includes at least one type of substances selected from among hydrogen, helium, nitrogen, oxygen, water, water vapor, carbon monoxide, carbon dioxide, nitrogen oxides, ammonia, sulfur oxides, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

The above-described method of producing the separation membrane complex 1 includes the step of continuously arranging the porous portion 41 and the dense portions 42 of the support 11 (step S21), the step of forming the separation membrane 12 on the porous portion 41 of the support 11 (step S24), and the step of forming the coating membrane 13 composed by a layered inorganic compound on the boundary portion 45 between the separation membrane 12 and the dense portion 42 to coat the boundary portion 45, the separation membrane 12 having the end portion that is in contact with the dense portions 42 (step S26). This allows easy formation of the dense coating membrane 13 and consequently allows easy production of the separation membrane complex 1 that exhibits high separation performance.

As described above, the method of producing the separation membrane complex 1 may preferably further include the step of heat-treating the support 11, the separation membrane 12, and the coating membrane 13 at a temperature of higher than or equal to 200° C. after step S26 (step S27). This improves the adhesion of the separation membrane 12 and the dense portions 42 to the coating membrane 13 and also improves the denseness of the coating membrane 13.

The separation membrane complex 1, the method of producing the separation membrane complex 1, the separation apparatus 2, and the separation method described above may be modified in various ways.

For example, the average thickness of the coating membrane 13 does not necessarily have to be greater than or equal to 0.002 μm and also does not necessarily have to less than or equal to m. That is, the average thickness of the coating membrane 13 may be less than 0.002 μm, or may be greater than 10 μm.

As described above, in the separation membrane complex 1 illustrated in FIG. 2, the end portions in the longitudinal direction of the separation membrane 12 almost do not overlap the through holes 111 in the radial direction (i.e., in the up-down direction in FIG. 2), but they may overlap the through holes 111.

Figures 7, 8:
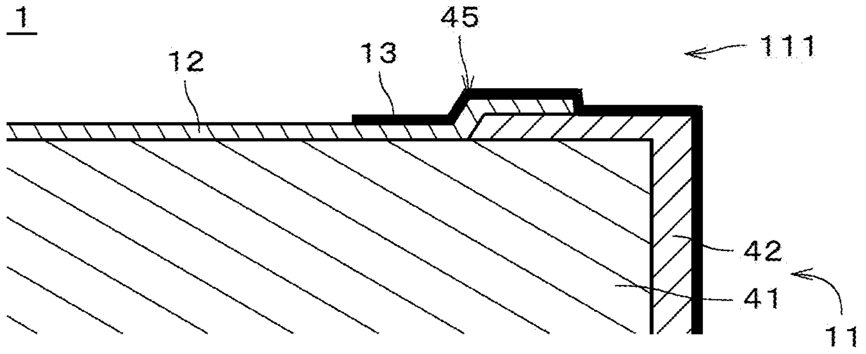
FIG. 7 is a flowchart of production of the separation membrane complex.
FIG. 8 is a sectional view illustrating an end portion of another separation membrane complex in enlarged dimensions.

For example, as illustrated in FIG. 8, the end portions in the longitudinal direction of the dense portion 42 may be in direct contact with the inside surfaces of the through holes 111 of the porous portion 41, and the end portions in the longitudinal direction of the separation membrane 12 may be provided on the dense portions 42. In other words, the end portions in the longitudinal direction of the separation membrane 12 may be in indirect contact with the inside surfaces of the through holes 111 of the porous portion 41 via the dense portions 42. In this case, each of the boundary portions 45 between the separation membrane 12 and the dense portions 42 refers to an approximately circumferential portion in which a plane obtained by extending an approximately circumferential region in which the edge of the dense portion 42 is in contact with the separation membrane 12 in a direction perpendicular to the surface of the porous portion 41 intersects with the surface of the separation membrane 12. The coating membrane 13 coats approximately the whole of the boundary portions 45 and extends to both sides in the longitudinal direction from the boundary portions 45. This improves the separation performance of the separation membrane complex 1 as described above and also allows easy formation of the dense coating membrane 13.

Figure 9:
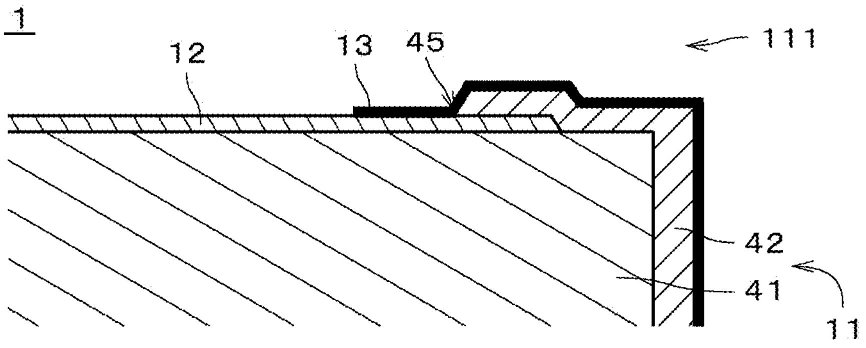
FIG. 9 is a sectional view illustrating an end portion of another separation membrane complex in enlarged dimensions.

As an alternative, as illustrated in FIG. 9, the end portions in the longitudinal direction of the separation membrane 12 may be in direct contact with the inside surfaces of the through holes 111 of the porous portion 41, and the end portions in the longitudinal direction of the dense portions 42 may be provided on the separation membrane 12. In other words, the end portions in the longitudinal direction of the dense portions 42 may be in indirect contact with the inside surfaces of the through holes 111 of the porous portion 41 via the separation membrane 12. In this case, the boundary portions 45 between the separation membrane 12 and the dense portions 42 refer to approximately circumferential portions in which the separation membrane 12 is in contact with the edges of the dense portions 42 in the radial direction of the through holes 111. The coating membrane 13 coats approximately the whole of the boundary portions 45 and extends to both sides in the longitudinal direction from the boundary portions 45. This improves the separation performance of the separation membrane complex 1 as described above and also allows easy formation of the dense coating membrane 13.

Figure 10:
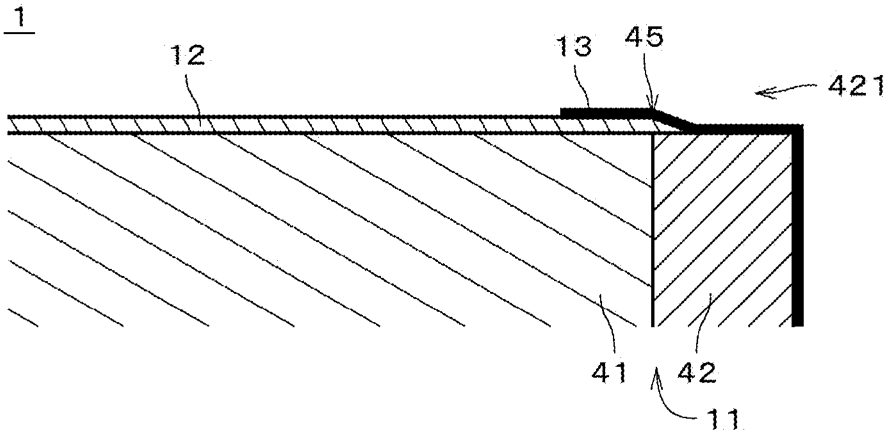
FIG. 10 is a sectional view illustrating an end portion of another separation membrane complex in enlarged dimensions.

As another alternative, as illustrated in FIG. 10, the dense portions 42 may be fixed to the end faces of the porous portion 41 in the longitudinal direction. The porous portion 41 and the dense portions 42 may have approximately the same sectional shape, or may have different sectional shapes. The separation membrane 12 is provided on the porous portion 41 and also extends to above the dense portions 42. That is, the separation membrane 12 coats boundary portions between the porous portion 41 and the dense portions 42. In this case, the boundary portions 45 between the separation membrane 12 and the dense portions 42 refer to approximately circumferential regions in which the separation membrane 12 is in contact with the edges of the dense portions 42 in the radial direction of the through holes 111. The coating membrane 13 coats approximately the whole of the boundary portions 45 and extends to both sides in the longitudinal direction from the boundary portions 45. This improves the separation performance of the separation membrane complex 1 as described above and also allows easy formation of the dense coating membrane 13. In the example illustrated in FIG. 10, the coating membrane 13 coats approximately the entire inside surfaces of through holes 421 of the dense portions 42.

The method of producing the separation membrane complex 1 is not limited to the examples described above, and may be modified in various ways. For example, the step of heat-treating the separation membrane 12 and the coating membrane 13 at a temperature of higher than or equal to 200° C. (step S27) may be omitted.

The separation membrane complex 1 may further include, in addition to the support 11, the separation membrane 12, and the coating membrane 13, a functional membrane or a protection membrane laminated on the separation membrane 12. Such a functional or protection membrane may be an inorganic membrane such as a zeolite membrane, a silica membrane, or a carbon membrane, or may be an organic membrane such as a polyimide membrane or a silicone membrane.

As described above, the separation membrane 12 may be a membrane other than a zeolite membrane (e.g., the inorganic membrane or the organic membrane described above).

In the separation apparatus 2 and the separation method described above, substances other than those given as examples in the above description may be separated from a mixture of substances. Moreover, the structure of the separation apparatus 2 is not limited to the example described above, and may be modified in various ways.

The configurations of the above-described preferred embodiments and variations may be appropriately combined as long as no mutual inconsistencies arise.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The separation membrane complex according to the present invention may, for example, be usable as a gas separation membrane, and may also be usable in various fields as a separation membrane or an absorbent membrane for various substances other than gas.

REFERENCE SIGNS LIST

1 separation membrane complex
2 separation apparatus
11 support
12 separation membrane
13 coating membrane
26 supplier
41 porous portion
42 dense portion
45 boundary portion
S11 to S12, S21 to S27 step

The invention claimed is:

1. A separation membrane complex comprising:

a support including a porous portion and a dense portion that are arranged continuously;

a separation membrane provided on said porous portion of said support and having an end portion that is in contact with said dense portion; and a coating membrane composed by a layered inorganic compound and coating a boundary portion between said dense portion and said separation membrane, and wherein said layered inorganic compound is a clay mineral.

2. The separation membrane complex according to claim 1, wherein said layered inorganic compound is smectite.

3. The separation membrane complex according to claim 1, wherein said coating membrane has an average thickness of greater than or equal to 0.002 μm.

4. The separation membrane complex according to claim 1, wherein said separation membrane is a zeolite membrane.

5. A separation apparatus comprising:

the separation membrane complex according to claim 1; and a supplier that supplies a mixture of substances that includes a plurality of types of gas or liquid to said separation membrane complex, wherein said separation membrane complex separates a substance with high permeability in said mixture of substances from said mixture of substances by allowing said substance to permeate through said separation membrane complex.

6. A separation method comprising:

a) preparing the separation membrane complex according to claim 1; and b) supplying a mixture of substances that includes a plurality of types of gas or liquid to said separation membrane complex and separating a substance with high permeability in said mixture of substances from said mixture of substances by allowing said substance to permeate through said separation membrane complex.

7. The separation method according to claim 6, wherein said mixture of substances includes one or more types of substances selected from among hydrogen, helium, nitrogen, oxygen, water, water vapor, carbon monoxide, carbon dioxide, nitrogen oxides, ammonia, sulfur oxides, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

8. A method of producing a separation membrane complex, comprising:

a) continuously arranging a dense portion and a porous portion of a support;

b) forming a separation membrane on said porous portion of said support; and c) forming a coating membrane composed by a layered inorganic compound on a boundary portion between said separation membrane and said dense portion to coat said boundary portion, said separation membrane having an end portion that is in contact with said dense portion, and wherein said layered inorganic compound is a clay mineral.

9. The method of producing a separation membrane complex according to claim 8, wherein said layered inorganic compound is smectite.

10. The method of producing a separation membrane complex according to claim 8, wherein said coating membrane has an average thickness of greater than or equal to 0.002 μm.

11. The method of producing a separation membrane complex according to claim 8, wherein said separation membrane is a zeolite membrane.

12. The method of producing a separation membrane complex according to claim 8, further comprising:

after said operation c), heat-treating said support, said separation membrane, and said coating membrane at a temperature of higher than or equal to 200° C.

* * * * *